(12) United States Patent
Ahn et al.

(10) Patent No.: US 11,815,958 B2
(45) Date of Patent: Nov. 14, 2023

(54) ELECTRONIC DEVICE FOR DISPLAYING APPLICATION-RELATED CONTENT, AND METHOD FOR CONTROLLING SAME

(71) Applicant: LG ELECTRONICS INC., Seoul (KR)

(72) Inventors: Shin Hui Ahn, Seoul (KR); Eui Taek Oh, Seoul (KR); Ju Hye Lee, Seoul (KR); Sang Young Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/788,675

(22) PCT Filed: Dec. 23, 2019

(86) PCT No.: PCT/KR2019/018323
§ 371 (c)(1),
(2) Date: Jun. 23, 2022

(87) PCT Pub. No.: WO2021/132743
PCT Pub. Date: Jul. 1, 2021

(65) Prior Publication Data
US 2022/0365562 A1 Nov. 17, 2022

(51) Int. Cl.
*G06F 3/041* (2006.01)
*G06F 1/16* (2006.01)
(Continued)

(52) U.S. Cl.
CPC .......... *G06F 1/1652* (2013.01); *G06F 3/04817* (2013.01); *G09F 9/301* (2013.01)

(58) Field of Classification Search
CPC ........ G06F 1/16; G06F 1/1624; G06F 1/1652; G06F 3/0481; G06F 3/04817;
(Continued)

(56) References Cited

U.S. PATENT DOCUMENTS 10,452,156 B2   10/2019   Kang et al.
10,963,016 B1*  3/2021    Oh ................... G06F 1/1626
(Continued)

FOREIGN PATENT DOCUMENTS

KR   20100050102    5/2010
KR   1020170038308  4/2017
(Continued)

OTHER PUBLICATIONS

PCT International Application No. PCT/KR2019/018323, International Search Report dated Sep. 17, 2020, 4 pages.
(Continued)

*Primary Examiner* — Joe H Cheng
(74) *Attorney, Agent, or Firm* — LEE HONG DEGERMAN KANG WAIMEY

(57) ABSTRACT

According to an example embodiment of the present disclosure, an electronic device includes a display that is flexible, has at least a portion located at a first side of the electronic device, and is changeable in size to which the display is exposed to the first side, and a controller, wherein the controller is configured to display content related to a first application in at least a portion of the display exposed to the first side, identify an event that the display exposed to the first side is expanded in size, and display content related to a second application corresponding to the first application in at least a portion of the expanded display.

12 Claims, 13 Drawing Sheets

(51) Int. Cl.
*G06F 3/04817* (2022.01)
*G09F 9/30* (2006.01)

(58) Field of Classification Search
CPC .............. G06F 3/0482; G06F 3/04886; G06F 2203/04803; G09F 9/301; G09G 3/035; G09G 2320/0613; G09G 2380/02
See application file for complete search history.

(56) References Cited

U.S. PATENT DOCUMENTS

| | | | |
|---|---|---|---|
| 2013/0275910 A1 | 10/2013 | Kim et al. | |
| 2014/0245203 A1 | 8/2014 | Lee et al. | |
| 2018/0364827 A1* | 12/2018 | Chung | ................ G06F 1/1677 |
| 2019/0042066 A1 | 2/2019 | Kim et al. | |
| 2019/0065031 A1 | 2/2019 | Kang et al. | |
| 2019/0261519 A1* | 8/2019 | Park | ................ H04M 1/0268 |
| 2019/0278336 A1* | 9/2019 | Choi | ................ G06F 1/1652 |
| 2021/0124625 A1* | 4/2021 | Noh | ................ G06F 9/48 |
| 2021/0191558 A1 | 6/2021 | Jung et al. | |
| 2021/0201709 A1* | 7/2021 | Lee | ................ G06F 3/0481 |
| 2021/0350767 A1* | 11/2021 | Lee | ................ G06F 3/04886 |
| 2023/0051261 A1* | 2/2023 | Kim | ................ G06F 1/16 |
| 2023/0051784 A1* | 2/2023 | Lee | ................ H04M 1/725 |

FOREIGN PATENT DOCUMENTS

| | | |
|---|---|---|
| KR | 1020170069103 | 6/2017 |
| KR | 10-2017-0083404 | 7/2017 |
| KR | 1020190128843 | 11/2019 |

OTHER PUBLICATIONS

European Patent Office Application Serial No. 19957975.6, Search Report dated Aug. 25, 2023, 10 pages.

* cited by examiner

ELECTRONIC DEVICE FOR DISPLAYING APPLICATION-RELATED CONTENT, AND METHOD FOR CONTROLLING SAME

CROSS-REFERENCE TO RELATED APPLICATIONS

This application is the National Stage filing under 35 U.S.C. 371 of International Application No. PCT/KR2019/018323, filed on Dec. 23, 2019, the contents of which are all incorporated by reference herein in their entireties.

TECHNICAL FIELD

This disclosure relates to an electronic device for displaying content related to at least one application and a control method thereof, and one particular implementation relates to a method of displaying content related to a predetermined application based on an event that a display expands in size and an electronic device using the method.

BACKGROUND ART

Advances in network technologies and expansions of infrastructures have enabled an electronic device to perform various tasks. With such technological advances, it is required to perform various tasks simultaneously using a plurality of applications in parallel in a certain situation.

To use the plurality of applications in parallel, a screen having a size sufficiently large to display content on each of the applications is required. As such, a desire for an electronic device that provides a large screen has been also increasing.

However, a display providing a large screen may increase in size in proportion to a size of a screen. Thus, it is necessary to consider a portability as well as a size of the display in terms of an electronic device of which the portability is emphasized, such as a mobile terminal.

Accordingly, a method for selectively changing a size of a display by applying a flexible display to the electronic device may be taken into consideration and a method for effectively providing content related to a plurality of applications using a flexible display is required.

DISCLOSURE OF INVENTION

Technical Goals

An aspect provides an electronic device that identifies a second application based on at least one of information associated with the electronic device and a first application, thereby more effectively controlling application-related content to be displayed, and a control method thereof.

Technical goals of the present disclosure are not limited as mentioned above and, although not mentioned, may include goals that can be clearly understood by those skilled in the art to which the present disclosure pertains, from the following description.

Technical Solutions

According to an aspect, there is provided an electronic device including a display that is flexible, has at least a portion located at a first side of the electronic device, and is changeable in size to which the display is exposed to the first side, and a controller, wherein the controller is configured to display content related to a first application in at least a portion of the display exposed to the first side, identify an event that the display exposed to the first side is expanded in size, and display content related to a second application corresponding to the first application in at least a portion of the expanded display.

According to another aspect, there is also provided a method of controlling an electronic device including a display that is flexible, has at least a portion located at a first side of the electronic device, and is changeable in size to which the display is exposed to the first side, the method including displaying content related to a first application in at least a portion of the display exposed to the first side, identifying an event that the display exposed to the first side is expanded in size, and displaying content related to a second application corresponding to the first application in at least a portion of the expanded display.

Effects

According to example embodiments, it is possible to provide an electronic device and a control method of the electronic device that identifies a second application based on at least one of information related to the electronic device and a first application, thereby more effectively controlling application-related content to be displayed.

Further, according to example embodiments, it is possible to improve a user convenience related to a use of content by displaying application-related content based on an exposure size change of a display.

Effects are not limited to the aforementioned effects, and other effects not mentioned will be clearly understood by those skilled in the art from the description of the claims.

BEST MODE FOR CARRYING OUT THE INVENTION

Figure 1:
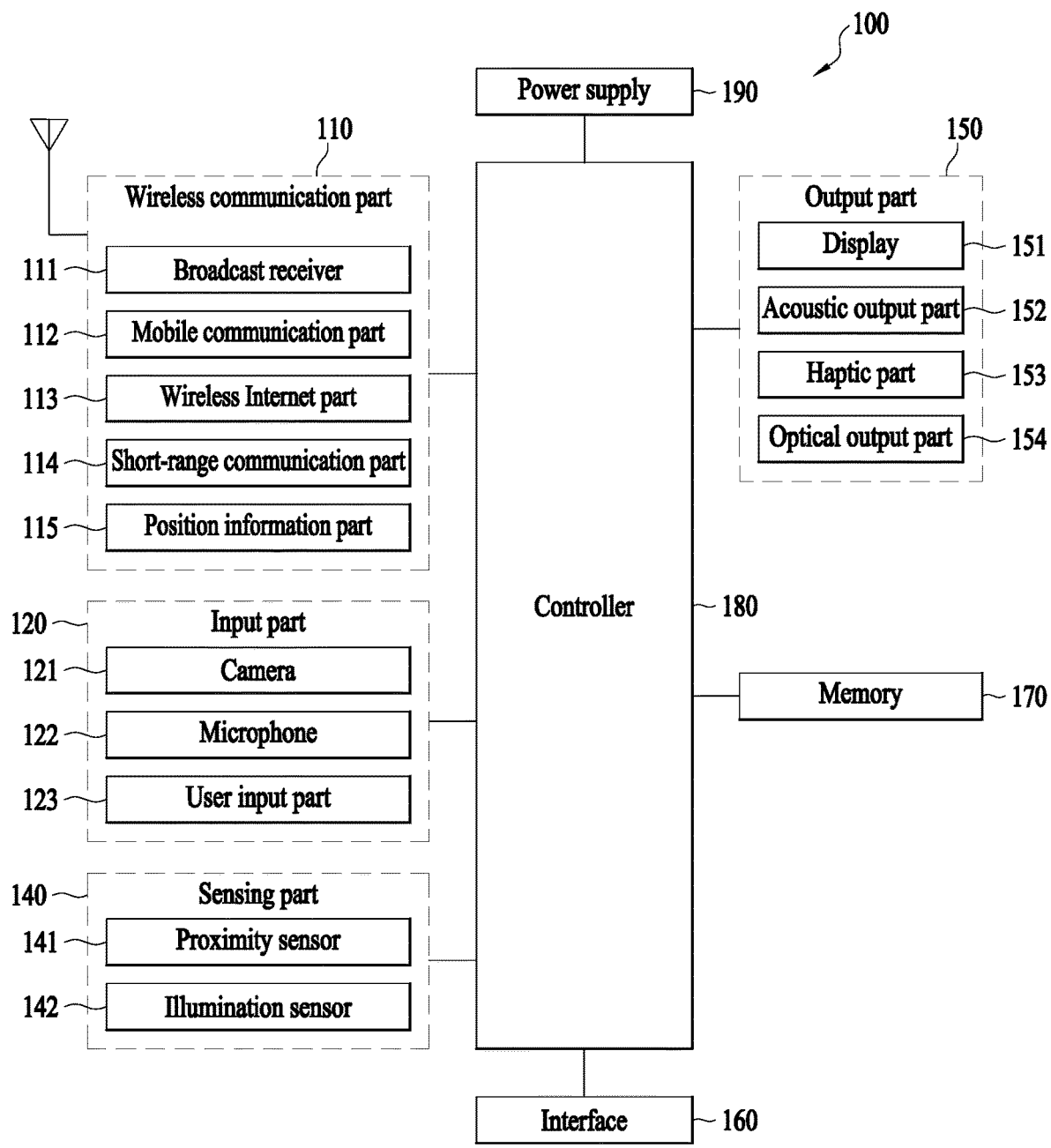
FIG. 1 is a block diagram illustrating an electronic device related to the present disclosure.

Hereinafter, example embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known arts will be omitted when it is deemed that such description will cause ambiguous interpretation of the present disclosure. In addition, the accompanying drawings are only for easy understanding of the embodiments disclosed in the present specification, and the technical ideas disclosed in the present specification are not limited by the accompanying drawings. Also, it should be understood to cover all modifications, equivalents, and alternatives falling within the spirit and scope of the present specification.

Although terms such as "first" and "second" may be used herein to describe various elements, these elements are not to be limited by these terms. Rather, these terms are only used to distinguish one element from another element.

When an element is described as being "connected to" or "coupled to" another element, it may be directly "connected to" or "coupled to" the other element, or there may be other elements intervening therebetween. In contrast, when an element is described as being "directly connected" or "directly coupled to" another element, there can be no other elements intervening therebetween.

The singular forms are intended to include the plural forms as well, unless the context clearly indicates otherwise.

In the present specification, it will be further understood that the terms "comprises" or "includes", when used herein, specify the presence of stated features, integers, steps, operations, elements, components, or combinations thereof, but do not preclude the presence or addition of one or more other features, integers, steps, operations, elements, components, or combinations thereof.

FIG. 1 is a block diagram illustrating an electronic device (or a mobile terminal) 100 related to an example embodiment of the present disclosure.

An electronic device 100 may include a wireless communication part 110, an input part 120, a sensing part 140, an output part 150, an interface 160, a memory 170, a controller (or processor) 180, and a power supply 190. The components illustrated in FIG. 1 are not essential to implementing the electronic device, so the electronic device 100 described herein may have more or fewer components than those listed above.

Specifically, the wireless communication part 110 may include at least one module that enables wireless communication to be performed between the electronic device 100 and a wireless communication system, between the electronic device 100 and another electronic device 100, or between the electronic device 100 and an external server. The wireless communication part 110 may include one or more modules that connect the electronic device 100 to one or more networks.

The wireless communication part 110 may include at least one of a broadcast receiver 111, a mobile communication part 112, a wireless Internet part 113, a short-range communication part 114, and a position information part 115.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may be to generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may function as the user input part 123 that provides an input interface between the electronic device 100 and a user and simultaneously, provide an output interface between the electronic device 100 and the user.

The interface 160 may function as a passage to various types of external devices connected to the electronic device 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic device 100 may perform an appropriate control associated with the connected external device.

The memory 170 may store data supporting various functions of the electronic device 100. The memory 170 may store application programs (or applications) run in the electronic device 100, data for operation of the electronic device 100, and instructions. At least a portion of the application programs may be downloaded from an external server through wireless communication. Also, at least a portion of the application programs may exist in the electronic device 100 for a basic function (for example, call forwarding and outgoing function and message receiving and outgoing function) of the electronic device 100 from the time of manufacture. The application program may be stored in the memory 170, installed in the electronic device 100, and run by the controller 180 to perform an operation (or function) of the mobile terminal.

The controller 180 may generally control an overall operation of the electronic device 100 in addition to operations related to the application programs. The controller 180 may process a signal, data, information, and the like input or output through the aforementioned components or run the application program stored in the memory 170, thereby providing information to a user or performing appropriate information or function.

In addition, to run the application program stored in the memory 170, the controller 180 may control at least a portion of the components shown in FIG. 1. Furthermore, to run the application program, the controller 180 may operate a combination of two or more components among the components included in the electronic device 100.

The power supply 190 may supply power to each component included in the electronic device 100 by receiving external or internal power under a control of the controller 180. The power supply 190 may include a battery. The battery may include a built-in battery or a removable battery.

At least a portion of the aforementioned components may operate in cooperation with each other to implement an operation, a control, or a control method of the electronic device 100 according to various embodiments as described below. In addition, the operation, control, or control method of the electronic device 100 may be implemented on the mobile terminal through an execution of at least one application program stored in the memory 170.

In the present disclosure, the electronic device 100 may refer to a mobile terminal obtained by applying a flexible display to the above-described mobile terminal. The flexible display may refer to a flexible display to be bent such that a winding area is changed.

The flexible display may refer to a lightweight and durable display manufactured on a thin and flexible substrate so as to be curved, bendable, folded, twisted, or rolled like a paper while having a characteristic of a typical flat panel display.

The flexible display may implement a flexible touch screen in combination with a touch sensor. In response to a touch being input through the flexible touch screen, the controller 180 may perform a control corresponding to the touch input.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal. The touch sensor may be configured to detect a position at which a touch object applying a touch on the touch screen is touched on the touch sensor, an area, a touch pressure, a touch capacitance, and the like.

The electronic device 100 may include a deformation detection part that detects a deformation of the flexible display. The deformation detection part may be included in the sensing part.

Information related to the deformation may include, for example, a direction in which the flexible display is deformed, a degree of deformation, a deformed position, a deformation time, and an acceleration at which the deformed flexible display is restored. In addition, the information related to the deformation may be various information to be detected in response to the flexible display being bent.

Also, based on the information related to the deformation of the flexible display detected by the deformation detection part, the controller 180 may change information displayed on the flexible display or generate a control signal for controlling functions of the electronic device 100.

A state change of the flexible display, for example, an expansion or reduction of a front surface area may occur due to an external force but not be limited thereto. For example, the front surface area of the flexible display may be expanded or reduced by the user or based on a command of an application. A driver may be included to change the state of the flexible display without applying the external force.

When the flexible display covers from the front surface to a rear surface, a space implemented in a typical rear case to mount an antenna may be restricted. Thus, the antenna may be embodied on the flexible display. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed to be the flexible display 151 unless otherwise state.

Figure 2:
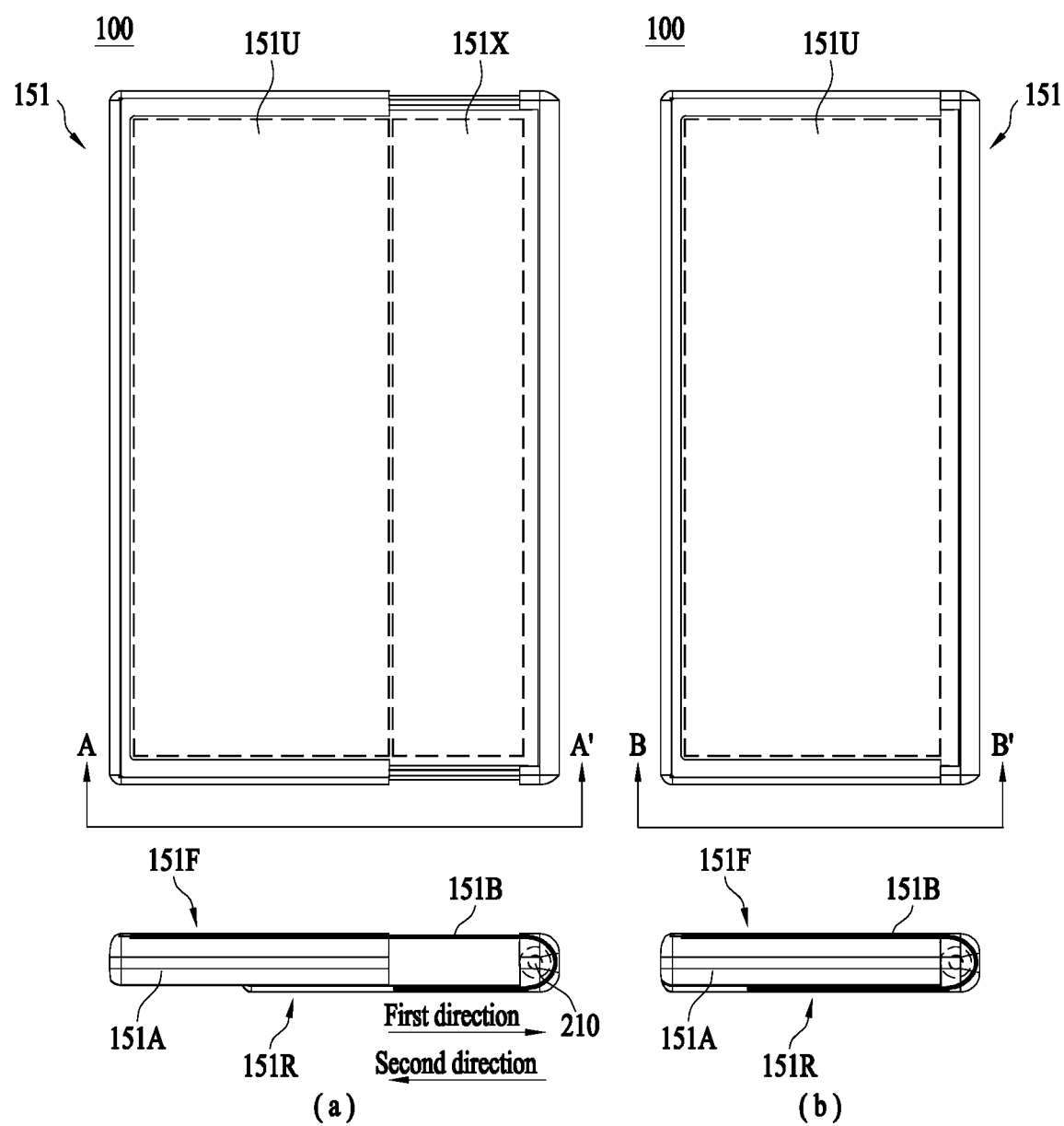
FIGS. 2 and 3 illustrate views obtained before and after an expansion of a display of an electronic device related to the present disclosure.
Figure 3:
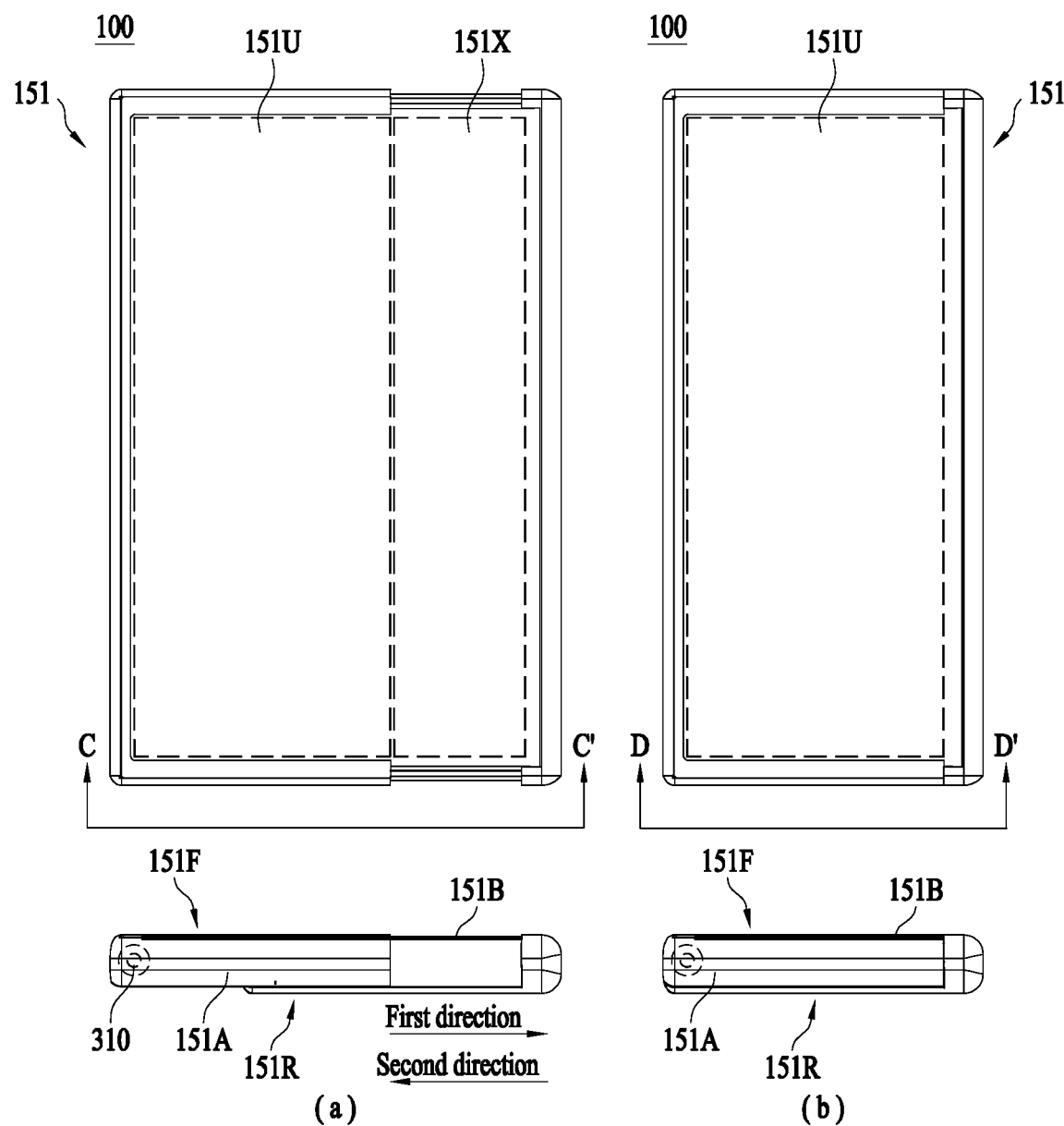

FIGS. 2 and 3 are conceptual diagrams illustrating states before and after a display 151 of the electronic device 100 is expanded according to an example embodiment of the present disclosure.

Specifically, FIG. 2 illustrates the case where an edge on which a display 151 is rolled up and out in relation to extension is a first direction edge 210, and FIG. 3 illustrates the case where an edge on which the display 151 is rolled up and out in relation to extension is a second direction edge 310 that opposes the first direction edge 210.

Specifically, (a) in FIG. 2 illustrates the electronic device 100 with the display 151 which is extended, and (b) in FIG. 2 illustrates the electronic device 100 with the display 151 which is not extended.

Referring to FIG. 2, the display 151 may have one side fixed at a front surface with reference to the electronic device 100 and may be rolled up on a first direction edge 210 to be provided on a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, if the front region 151F of the display 151 increases in area, the first direction edge 210 of the display 151 may move in the first direction, and, if the front region 151F of the display 151 decreases in area, the first direction edge 210 of the display 151 may move in the second direction.

In order to guide and support the display 151 to be extended or retracted, a frame supporting the display 151 may be extended or retracted as well. The frame may include a first frame 151A and a second frame 151B, which slidably moves in the first direction relative to the first frame 151A.

A part of the front region 151F to be maintained regardless of extension and retraction of the display 151 may be defined as a fixed part 151U. A part of the front region 151F to be selectively exposed according to extension and retraction of the display 151 may be defined as a variable part 151X. In a state that the front region 151F of the display 151 is extended, the fixed part 151U of the display 151 may be positioned at the first frame 151A and the variable part 151X of the display 151 may be positioned at the second frame 151B.

When the second frame 151B slidably moves in the first direction to be extended from the first frame 151A, the front region 151F of the display 151 may be extended, causing the fixed part 151U and the variable part 151X to be exposed to the front surface. When the second frame 151B slidably moves in a direction opposite to the first direction to be retracted toward the first frame 151A, the front region 151F of the display 151 may be reduced as well, causing only the fixed part 151U to remain exposed to the front surface.

The rear region of the display 151 may be exposed to a rear surface of the second frame 151B. The rear region of the display 151 may be covered by a light-transmitting rear window and therefore visible from the outside.

Meanwhile, the front region 151F of the display 151 may be exposed to a front surface without an additional window. In some cases, however, a deco frame may cover a boundary region between the front region 151F and the first frame 151A, thereby preventing an external material and covering a bezel region of the electronic device to help visibility of a screen for a user.

An electronic part may be formed in an inner space formed by external structures such as the first frame 151A and the second frame 151B. An electronic component for driving the electronic device 100, such as a battery 191, may be mounted at a main printed circuit board (PCB) and thus provided in the electronic part. Alternatively, an electronic component such as an internal antenna module may be mounted directly at the electronic part rather than mounted at the main PCB.

In an example embodiment, the electronic device 100 may include a driving part for controlling a size of the display 151. The driving part may be implemented, for example, using a motor. The electronic device 100 may control a size of the display 151 by controlling a moving direction of the first direction edge 210 of the display 151 using a motor.

Specifically, (a) of FIG. 3 illustrates an electronic device 100 with a display 151 which is extended, and (b) of FIG. 3 illustrates the electronic device 100 with the display 151 which is not extended.

Referring to FIG. 3, the display 151 may have one side fixed at a front region with reference to the electronic device 100 and may be rolled up on a second direction edge 310 to be provided over a back surface (or a rear surface). A front region 151F of the display 151 may be extended. When the front region 151F of the display 151 is extended, a rear region 151R of the display 151 may be reduced. On the contrary, when the front region 151F of the display 151 is reduced, the rear region 151R of the display 151 may be extended.

A direction in which the front region 151F of the display 151 is extended may be defined as a first direction, and a direction in which the front region 151F of the display 151 is reduced may be defined as a second direction. In this case, even when the front region 151F of the display 151 increases or decreases in area, the second direction edge 310 of the display 151 may remain at the same position. A redundant description of FIG. 3 with FIG. 2 will be omitted.

In FIGS. 2 and 3, the display is described as being extended in the first direction, but not limited thereto. For example, the display may be extended in the second direction. In the following description, the display may be extended in various directions (e.g., the first direction or the second direction).

Figure 4:
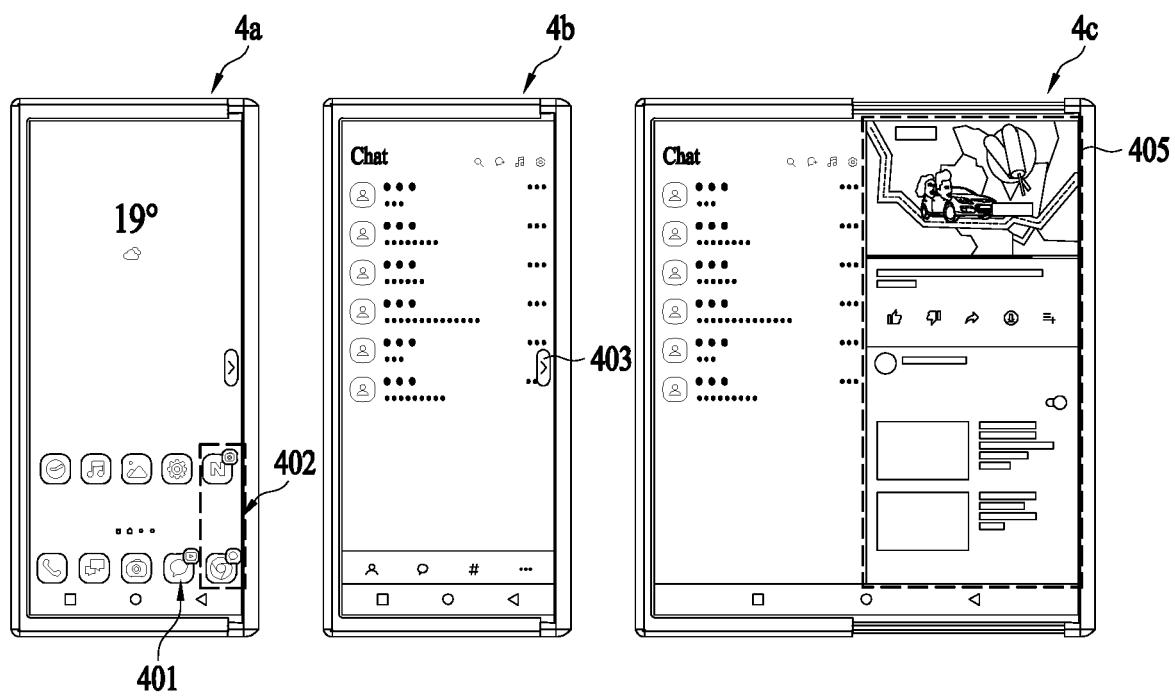
FIG. 4 is a diagram illustrating an example of displaying content on an electronic device according to an example embodiment of the present disclosure.

FIG. 4 is a diagram illustrating an example of displaying content on an electronic device according to an example embodiment of the present disclosure.

In the example embodiment, on a display, the electronic device may display a screen corresponding to reference numeral 4a, 4b, or 4c related to parallel execution of a plurality of applications.

A plurality of applications set to be run in parallel (hereinafter, referred to as an "application set") may include a first application and a second application. The first application may correspond to an application that is run as a main application, and the second application may correspond to an application that is run as a sub-application.

In some cases, the electronic device may include at least one application set including a plurality of applications set to run in parallel. For example, the electronic device may include a first application set including a first application run as a main application and a second application run as a sub-application, and a second application set including a third application run as a main application and a fourth application run as a sub-application. Here, the application set may be designated in advance, and a related description will be made with reference to FIG. 5 or 6.

The reference numeral 4a indicates an example of a screen provided when three application sets are present. According to the reference numeral 4a, icons of applications included in the first application set may be represented like a first icon 401. Specifically, the first icon 401 may be represented as an icon of a main application with a superscript icon that represents a sub-application.

As indicated in a first area 402, another application set (e.g., the second application set and the third application set) may be represented by an icon of a main application with a superscript icon that represents a sub-application. However, this is merely an example. The application set may be represented with an icon in a new form or represented, for example, in a subscript form or in a listing form by changing a position of the icon of the sub-application.

In the example embodiment, the screen corresponding to the reference numeral 4a may appear when a predetermined condition is satisfied. The predetermined condition may include, for example, a case in which a position of the electronic device corresponds to a predetermined position or a case in which a current time corresponds to a predetermined time but is not limited thereto.

As an example, if the predetermined condition is satisfied while the icon for the main application is displayed, an icon representing an application set such as the first icon 401 may be displayed at a position at which the icon for the main application has been displayed.

As another example, if the predetermined condition is satisfied while the icon for the main application is displayed, the icon for the sub-application related to the icon for the main application may be added. Accordingly, an icon like the first icon 401 may be displayed.

The reference numeral 4b indicates an example of content displayed when an input to the first icon 401 is received while the screen of the reference numeral 4a is displayed.

In the example embodiment, in the first icon 401, the first application that is run as the main application may be a messenger application and the second application that is run as the sub-application may be an application for viewing an image. In this case, when an input to the first icon 401 is received while the display is not expanded, content related to the first application may be displayed as indicated by the reference numeral 4b.

In the example embodiment, the electronic device may provide a second icon 403 related to a display expansion. In response to the input to the second icon 403 being received, the electronic device may expand the display.

In response to an event (e.g., reception of the input to the second icon 403) that the display is expanded in size being identified, the display may be expanded. In this instance, the reference numeral 4c indicates an example of content displayed on the expanded display. Specifically, the reference numeral 4c indicates content displayed on the display expanded when the input to the second icon 403 is received in a state of the reference numeral 4b.

According to the reference numeral 4c, the electronic device may provide content related to the second application in response to the display being expanded. In the example embodiment, the content on the second application may be provided in a first area 405 corresponding to a size of an expanded portion of the display.

In the example embodiment, irrespective of the first input, the electronic device may display the content related to the second application when the display is expanded in size in response to a predetermined condition (e.g., the case in which the position of the electronic device corresponds to the predetermined position) being satisfied while the content related to the first application is displayed as indicated by the reference numeral 4b.

Figure 5:
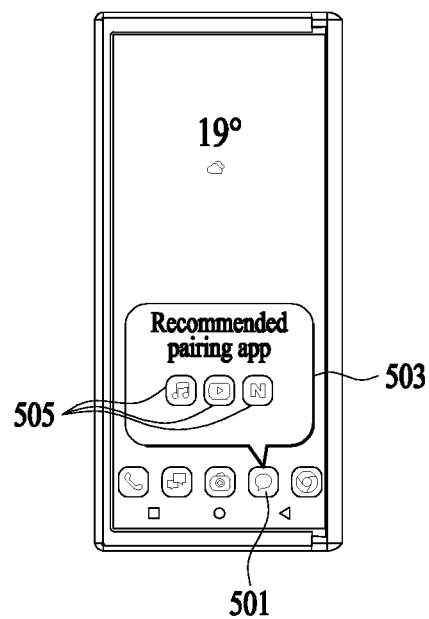
FIG. 5 is a diagram illustrating another example of displaying content on an electronic device according to an example embodiment of the present disclosure.

FIG. 5 is a diagram illustrating another example of displaying content in an electronic device according to an example embodiment of the present disclosure. Specifically, FIG. 5 illustrates an example of a screen in which content for setting a plurality of applications executed in parallel is displayed.

Referring to FIG. 5, a setting window 503 including information on an application candidate to be matched may be displayed based on a predetermined input being applied to an icon 501 corresponding to a main application among a plurality of applications to be run in parallel.

The setting window 503 may include information on at least one application. As illustrated, the information on the at least one application may include an icon 505 representing each application, but it is merely an example.

In the example embodiment, an application candidate to be matched to the main application may be determined based on execution history information of an application. Here, the execution history information may include, for example, history information of an application executed along with the main application, history information of an application executed before or after the main application is executed, or history information of an application executed a predetermined number of times or for a predetermined period of time or more.

More specifically, for example, when the electronic device provides a multitasking function, the history information of the application executed along with the main application may include information on an application including a history that the application has been executed along with the main application based on the multitasking function. Here, the multitasking function may include a function of executing a plurality of applications in parallel. More specifically, the display may display content related to applications executed in parallel when the multitasking function is performed. In addition, the display may display content corresponding to at least one of an application that has been running in the background and an application newly executed in response to the multitasking function being performed.

The history information of the application executed before or after the main application is executed may include information on an application executed previously or afterward based on a point in time that the main application has been executed.

The history information of the application executed the predetermined number of times or for the predetermined period of time or more may include information on the application executed the predetermined number of times or for the predetermined period of time or more, or information on an application that has been run the predetermined number of times or for the predetermined period of time or more within a predetermined time interval including the point in time that the main application has been executed.

In the example embodiment, the application candidate to be matched to the main application may include at least one application previously designated in relation to the main application corresponding to the icon 501.

In some cases, the parallel execution of the plurality of applications may be set in connection to a predetermined condition. In such cases, the icon 505 included in the setting window 503 may include an icon corresponding to each of at least one application related to the predetermined condition.

If the predetermined condition is a condition that a position of the electronic device corresponds to a predetermined position, the icon 505 included in the setting window 503 may include, for example, an icon corresponding to each of at least one application having a history that the application has been executed at the predetermined position or an icon corresponding to each of at least one application having a history that the application has been executed along with the main application at the predetermined position.

If the predetermined condition is a condition that the position of the electronic device corresponds to a predetermined time, the icon 505 included in the setting window 503 may include, for example, an icon corresponding to each of at least one application having a history that the application is executed in the predetermined time or an icon corresponding to each of at least one application having a history that the application is executed along with the main application in the predetermined time.

Meanwhile, the plurality of applications to be executed in parallel may also be referred to as, for example, a pairing app or a multitasking app in some cases. However, the present embodiment is not limited by the terminology.

Figure 6:
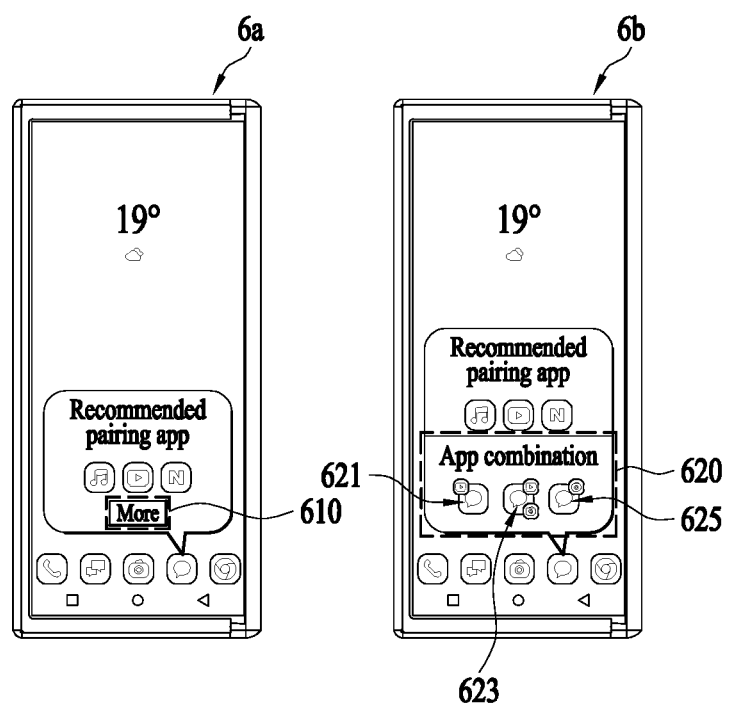
FIG. 6 is a diagram illustrating still another example of displaying content on an electronic device according to an example embodiment of the present disclosure.

FIG. 6 is a diagram illustrating another example of displaying content in an electronic device according to an example embodiment of the present disclosure. Specifically, FIG. 6 illustrates an example of a screen providing detailed information on an application to be executed in parallel with a main application based on multitasking-related information.

Reference numeral 6a indicates a case in which content 610 is displayed to provide information in detail on the screen corresponding to FIG. 5. When an input to the content 610 is received, a screen may be provided as indicated by reference numeral 6b.

According to the reference numeral 6b, a setting window may be expanded so that a first area 620 appears. In the first area 620, detailed recommendation information for recommending an application to be run in parallel with the main application may be provided.

In the example embodiment, recommendation information may be based on information associated with the main application acquired from another device (e.g., server). As an example, the recommendation information may be acquired from a predetermined server related to the electronic device and include information on at least one application including a history that the corresponding application has been run in parallel with a main application in another device in which the main application is installed.

As another example, the recommendation information may be acquired from a predetermined server related to the electronic device and include information on at least one application including a history that the corresponding application has been run the predetermined number of times or for the predetermined period of time or more along with a main application in another electronic device in which the main application is installed.

According to the reference numeral 6b, the recommendation information may include content in a form of an icon. As an example, the recommendation information may include information on an icon represented in a superscript form at an upper left corner of the main application as shown by a first icon 621. If a plurality of applications is to be recommended, the recommendation information may include information on an icon in which icons representing the applications to be recommended are arranged on the main application as shown by a second icon 623. As another example, the recommendation information may include information on an icon represented in a superscript form at an upper right corner of the main application as shown by a third icon 625.

However, the content included in the recommendation information as shown nu the reference numeral 6b is merely an example, and the present embodiment is not limited by the example. For example, the content included in the recommendation information may include an icon in which an arrangement of icons representing applications is randomly changed, or may include different types of content.

Figure 7:
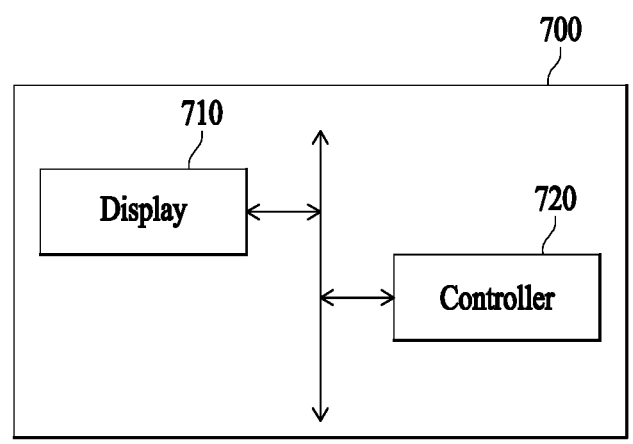
FIG. 7 is a functional block diagram illustrating an electronic device according to an example embodiment of the present disclosure.

FIG. 7 is a functional block diagram illustrating an electronic device according to an example embodiment of the present disclosure. In the following description, an element of the electronic device 400 may indicate a unit that processes at least one function or operation, and may be implemented as hardware or software, or a combination of hardware and software.

Referring to FIG. 7, an electronic device 700 may include a display 710 and a controller 720.

The display 710 may be disposed to be changeable in size to which the display 710 is exposed to a first side (e.g., a front side of the electronic device 600) of the electronic device 700. The display 710 may be implemented to be flexible.

The display 710 may display various information associated with an operation of the electronic device 700. The various information may include, for example, content related to an application executed in the electronic device 700.

In the example embodiment, a portion of the display 710 may be located at the first side and another portion may be wound at one side of the electronic device 600 so as to be located at a second side of the electronic device 700. Here, the second side may include a rear side that faces the first side in the electronic device.

Specifically, the display 710 may be bent at one end adjoining the first side such that at least a portion of the display 710 is located at the first side and at least another portion is located at the second side adjoining the one end. Meanwhile, since the related description has been made with reference to FIG. 2 or 3, repeated descriptions will be omitted.

The controller 720 may display content related to a first application in at least a portion of the display 710 exposed to the first side. Here, the first side may correspond to, for example, the front side of the electronic device 700 but is not limited thereto. The content related to the first application may include content provided based on an execution of the first application. For example, when the first application is a messenger application, the content may include a message enter window or a message check window.

In the example embodiment, the controller 720 may identify a first input related to the execution of the first application. In response to the first input being identified, the controller 720 may display the content related to the first application corresponding to the first input in at least a portion of the display.

The first input may include a touch input corresponding to a first icon. The first icon may be an icon related to the first application and a second application and include, for example, an image corresponding to the first application and an image corresponding to the second application. However, it is merely an example, and a different type of icon or content may be provided.

In the example embodiment, the controller 720 may display the first icon based on at least one of current time information and a position of the electronic device 700. Specifically, the controller 720 may identify at least one of the current time information and the position of the electronic device 700 and display the first icon corresponding to information on an application related to the identified at least one on the display 710. Here, the application related to the at least one may include the first application and the second application.

For example, when the position of the electronic device 700 is identified to be a first position (e.g., home), the controller 720 may identify an application set (e.g., the first application and the second application) designated in relation to the first position and display the first icon for the application set. When the position of the electronic device 700 is changed to a second position (e.g., gym), the controller 720 may display a second icon for a plurality of applications (e.g., a first application and a third application) designated in relation to the second position.

In the example embodiment, a plurality of application sets may be designated according to the position of the electronic device 700 (or the current time information). For example, two or more application sets may be designated in relation to the first position. In this example, the controller 720 may display icons representing the plurality of application sets.

In the example embodiment, the controller 720 may identify the second application based on the current time information and the position of the electronic device 700. In response to the second application being identified, the controller 720 may provide the first icon. Here, the second application may include an application that is previously set to run in parallel with the first application under a predetermined condition (e.g., a case in which the position of the electronic device 700 corresponds to a predetermined position or a case in which a current time corresponds to a predetermined time).

In some cases, when a plurality of applications is to be run in parallel with the first application, the second application may include a plurality of applications. In such cases, the first icon may include images representing the plurality of applications corresponding to the second application.

In the example embodiment, the controller 720 may verify whether the position of the electronic device 700 corresponds to a predetermined position. The controller 720 may identify the position of the electronic device 700 at intervals of a preset period of time, thereby verifying whether the position of the electronic device 700 corresponds to a predetermined position. The predetermined position may be a position set by a user, such as a subway station, home, or a gym, for example.

When the position of the electronic device 700 corresponds to the predetermined position, the controller 720 may identify the predetermined position and the second application related to the first application. Here, the second application may include an application that is previously set to run at the predetermined position in parallel with the first application.

In another example embodiment, the controller 720 may verify whether the current time corresponds to the predetermined time. The controller 720 may identify the current time at intervals of a preset period of time, thereby verifying whether the current time corresponds to the predetermined time. The predetermined time may include a predetermined point in time or include a predetermined time interval.

As an example, the predetermined time may include a point in time corresponding to 8:00 am. As another example, the predetermined time may include a time interval corresponding to 8:00 am to 9:00 am.

When the current time corresponds to the predetermined time, the controller 720 may identify the predetermined time and the second application related to the first application. Here, the second application may include an application that is previously set to run in parallel with the first application in the predetermined time.

As a more specific description related to the second application, in the example embodiment, the second application may be an application identified based on at least one of execution history information of an application and setting information of an application corresponding to the first application.

The execution history information of the application may include history information of an application executed along with the first application, history information of an application executed before or after an execution of the first application, or history information of an application executed a predetermined number of times or for a predetermined period of time or more.

More specifically, the history information of the application executed along with the first application may include information on at least one application having a history that the corresponding application has been run in parallel with the first application.

The history information of the application executed before or after the execution of the first application may include information on at least one application having a history that the corresponding application has been run within a predetermined time interval based on a point in time at which the first application is executed. As an example, when the predetermined time interval is one minute, and when the first application is executed at 8:10 am, the history information of the application executed before or after the execution of the first application may include information on an application having a history that the corresponding application has been executed in a time interval between 8:09 am and 8:11 am.

As another example, when the predetermined time interval is one minute, and when the first application is run for a period of time from 8:10 am to 8:15 am, the history information of the application executed before or after the execution of the first application may include information on an application having a history that the application has been executed in a time interval between 8:09 am and 8:10 am and a time interval between 8:15 am and 8:16 am.

The history information of the application executed the predetermined number of times or for the predetermined period of time or more may include information on at least one application having a history that the corresponding application has been executed the predetermined number of times or for the predetermined period of time or more in the electronic device 700.

The setting information of the application corresponding to the first application may include information on at least one application that is previously selected to run along with the first application. In some cases, the setting information of the application corresponding to the first application may include information on at least one application that is previously selected to run along with the first application for each predetermined location or for each predetermined time. A related example will be described in detail with reference to FIG. 9 or 10.

In the example embodiment, the controller 720 may identify the second application based on at least one of the execution history information of the application and the setting information of the application corresponding to the first application as described above. As an example, the controller 720 may identify an application having a history that the application has been run along with the first application to be the second application. As another example, the controller 720 may identify an application having a history that the application has been executed before or after the execution of the first application to be the second application.

In the example embodiment, the controller 720 may identify the second application based on at least one of the predetermined location, the predetermined time, the execution history information, and the setting information of the application corresponding to the first application.

As an example, when the predetermined location is home, the controller 720 may identify an application having a history that the application has been executed at home before or after the execution of the first application, to be the second application. As another example, when the predetermined time includes a first time interval from 8:00 am to 10:00 am, the controller 720 may identify an application having a history of running within the first time interval to be the second application.

In the example embodiment, the second application may include at least one of applications identified based on at least one of the execution history information of the application and the setting information of the application corresponding to the first application. For example, the second application may include an application selected by a user input based on a provision of information on the identified application.

The information on the identified application may include an icon representing each identified application. In addition, based on a reception of an input for selecting at least one of icons, an application of an icon corresponding to the input may be determined to be the second application. A related example is described in detail with reference to FIG. 5 or 6.

The controller 720 may identify an event that a portion of the display 710 exposed to the first side is expanded in size. The event may include, for example, an event that an input to the second icon related to a size expansion of the display 710 is received. The controller 720 may expand a size of the display 710 based on the identification of the event.

The controller 720 may display content related to the second application corresponding to the first application in at least a portion of the expanded display. As described above, the second application may include an application previously designated to correspond to the first application based on at least one of the position of the electronic device 700, the current time information, the execution history information of the application, and the setting information of the application corresponding to the first application.

In the example embodiment, the controller 720 may display the content related to the second application based on a size of an expanded area of the display 710. For example, when the display is expanded by a size corresponding to a first area, the controller 720 may display the content related to the second application in an area corresponding to the first area.

In the example embodiment, when the position of the electronic device 700 corresponds to the predetermined position while the content related to the first application is being displayed, the controller 720 may identify the second application. When the event that the display 710 is expanded in size is identified, the controller 720 may display the content related to the second application in at least a portion of the expanded display 710 based on the identification of the second application.

Figure 8:
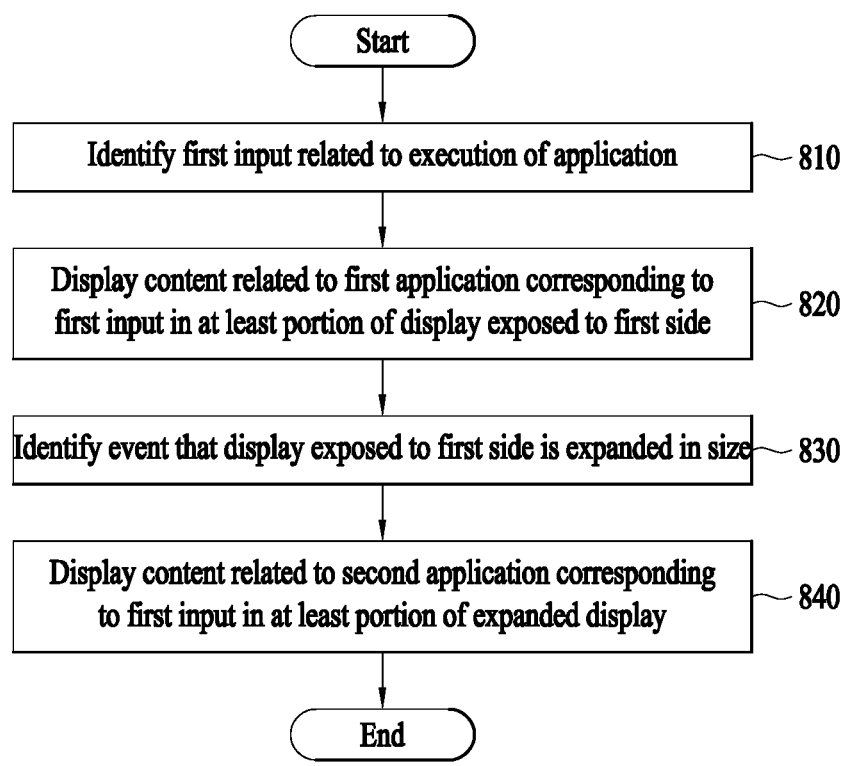
FIG. 8 is a flowchart illustrating operations of a method of controlling an electronic device according to an example embodiment of the present disclosure.

FIG. 8 is a flowchart illustrating a control method of an electronic device according to an example embodiment of the present disclosure. As would be apparent to one skilled in the art, in some cases, operations of FIG. 8 may be performed in a different order from that shown in the drawing.

Referring to FIG. 8, in operation 810, the electronic device may identify a first input related to an execution of an application. The first input may include a touch input corresponding to the first icon. The first icon may be an icon related to a first application and a second application. Based on an input to the first icon, content related to at least one of the first application and the second application may be displayed.

When a predetermined condition is satisfied, the electronic device may display the first icon. As an example, the predetermined condition may include a case in which a position of the electronic device corresponds to a first position or a case in which a current time corresponds to a first time. As another example, the predetermined condition may include a case in which a position of the electronic device corresponds to the first position and a current time corresponds to the first time.

The first icon may be previously designated based on the predetermined condition. For example, the first icon may include icons of the first application and the second application selected to run in parallel when the position of the electronic device is the first position. Here, the first application may be a main application that is run as a main, and the second application may be a sub-application that is run based on a display expansion.

In operation 820, the electronic device may display content related to the first application corresponding to the first input in at least a portion of the display exposed to a first side. Specifically, the electronic device may display the content related to the first application in at least a portion of the display exposed to the first side based on the identification of the first input.

At least a portion of the display in which the content related to the first application is displayed may include a portion exposed to a front side of the electronic device before the display is expanded.

In operation 830, the electronic device may identify an event that the display exposed to the first side is expanded in size. The event may include, for example, a case in which an input related to a display size expansion is received. In this case, the electronic device may expand the display in response to an input related to the size expansion being received.

In operation 840, the electronic device may display content related to the second application corresponding to the first input in at least a portion of the expanded display. The electronic device may display the content related to the second application in at least a portion of the expanded display based on the size expansion of the display. The second application may include an application that is previously designated to run in parallel with the first application under a predetermined condition (e.g., a case in which the electronic device is at a first position or a case in which a current time is a first time).

In some cases, the second application may include a plurality of applications. In such cases, the electronic device may display content related to each of the plurality of applications to correspond to an expanded area of the display.

In the example embodiment, the electronic device may display at least one of the content related to the first application and the content related to the second application irrespective of the first input. Specifically, when the predetermined condition is satisfied and the display is expanded in size while the content related to the first application is displayed, the electronic device may display the content related to the second application.

Figure 9:
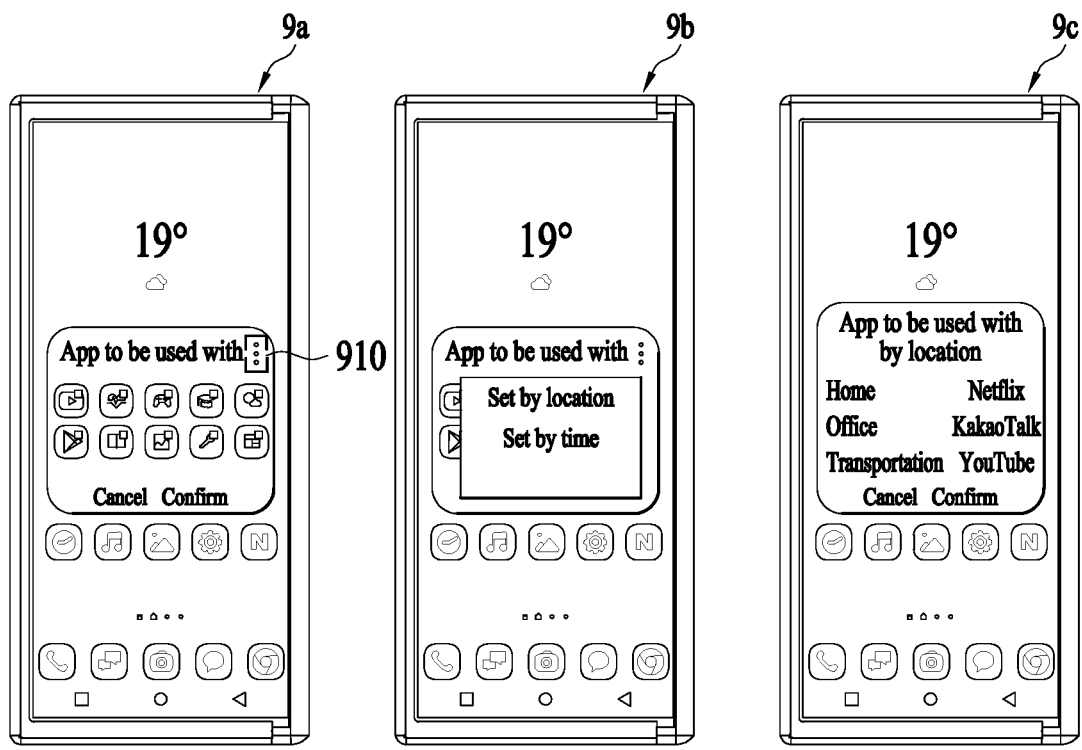
FIG. 9 is a diagram illustrating an example of a screen for setting content displayed on an electronic device according to an example embodiment of the present disclosure.

FIG. 9 is a diagram illustrating an example of a screen for setting content displayed on the electronic device according to an example embodiment of the present disclosure. Specifically, FIG. 9 illustrates an example of a screen displayed to designate a second application to be executed in parallel with a first application based on a location.

Reference numeral 9*a* indicates a screen that shows a candidate for the second application to be executed in parallel with the first application. The screen indicated by the reference numeral 9*a* may be displayed in response to a predetermined input being applied to the first application. However, it is merely an example, and the screen may be displayed based on an execution of a separate setting application.

In the example embodiment, the candidate for the second application may include information on at least one application installed in the electronic device. In this case, the second application to be executed in parallel with the first application may be determined to be an application selected by a user input from applications installed in the electronic device.

In the example embodiment, the candidate for the second application may include information on at least one application related to the first application. Specifically, the candidate for the second application may include at least one application related to the first application based on execution history information. For example, the candidate for the second application may include at least one application having a history that the corresponding application has been executed before or after an execution of the first application.

In the example embodiment, the candidate for the second application may include information on the application related to the first application, which is received from a server. Specifically, the candidate for the second application may include information on at least one application executed in relation to the first application in another electronic device, which is received from a server that acquires information on an application executed in the other electronic device.

In the example embodiment, in the screen indicated by the reference numeral 9a, a user input for selecting at least a portion of candidates for the second application may be received. In this case, depending on an embodiment, information on an application corresponding to the user input may be displayed.

Reference numeral 9b indicates an example of a screen provided based on an input to an icon 910 of the reference numeral 9a. The reference numeral 9b may be a window for setting a condition to execute an application selected by a user input (hereinafter, referred to as the "second application") along with the first application.

According to the reference numeral 9b, the second application may be executed along with the first application based on a location or time. When the second application is to be executed based on a location, a screen corresponding to reference numeral 9c related to location setting may be provided through an input to an area "set by location."

When the second application selected in relation to the reference numeral 9a includes a plurality of applications, the reference numeral 9c indicates a screen for setting a condition for a location in which each of the plurality of applications is to be executed in parallel with the first application.

According to the reference numeral 9c, when the second application includes applications such as Netflix, Messenger, and YouTube, Netflix may be set to run at home, Messenger may be set to run at an office, and YouTube may be set to run along with the first application in public transportation.

Figure 10:
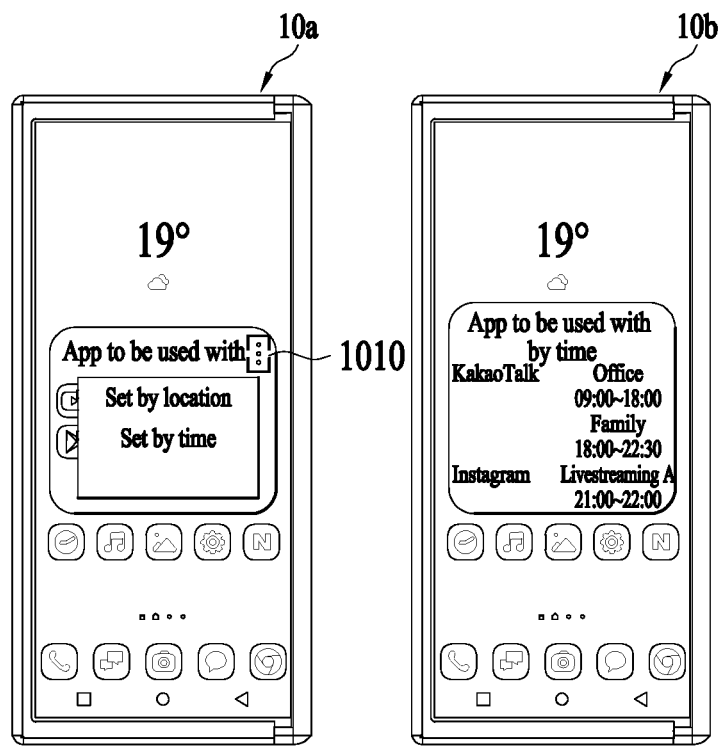
FIG. 10 is a diagram illustrating another example of a screen for setting content displayed on an electronic device according to an example embodiment of the present disclosure.

FIG. 10 is a diagram illustrating another example of a screen for setting content displayed on an electronic device according to an example embodiment of the present disclosure. Specifically, FIG. 10 illustrates an example of a screen displayed to designate a second application to be executed in parallel with a first application based on a time.

Reference numeral 10a may correspond to the reference numeral 9b of FIG. 9. That is, based on a reception of an input to an icon 1010, a screen of the reference numeral 10a may be provided. A screen corresponding to the reference numeral 10b related to time setting may be provided through an input to an area "set by time."

Reference numeral 10b indicates a screen for selecting a time interval for parallel execution with the first application for each application when the second application includes two applications, that is, Messenger and Instagram.

Reference numeral 10c illustrates an example of setting a predetermined page of a predetermined application to run in addition to setting the predetermined application to run on a time-by-time basis. However, it is merely an example, and simply setting the predetermined application to run on a time-by-time basis may also be possible.

According to the reference numeral 10c, a chat page "office group" of Messenger may be set to run in parallel with the first application from 9:00 am to 6:00 pm. A chat page "family group" of Messenger may be set to run in parallel with the first application from 6:00 pm to 10:30 pm. "Livestreaming A" of Instagram may be set to run in parallel with the first application from 9:00 pm to 10:00 pm.

Meanwhile, although not shown, setting a time interval and day of the week may also be possible for an execution time of the second application. For example, Instagram may be set to run in parallel with the first application from 9:00 pm to 10:00 pm on Thursday.

Although FIGS. 9 and 10 show examples in which the location setting and the time setting are made, respectively, the location setting and the time setting may also be integrally made together. For example, Messenger may be set to run in parallel with the first application from 10:00 am to 11:00 am at the office.

Figure 11:
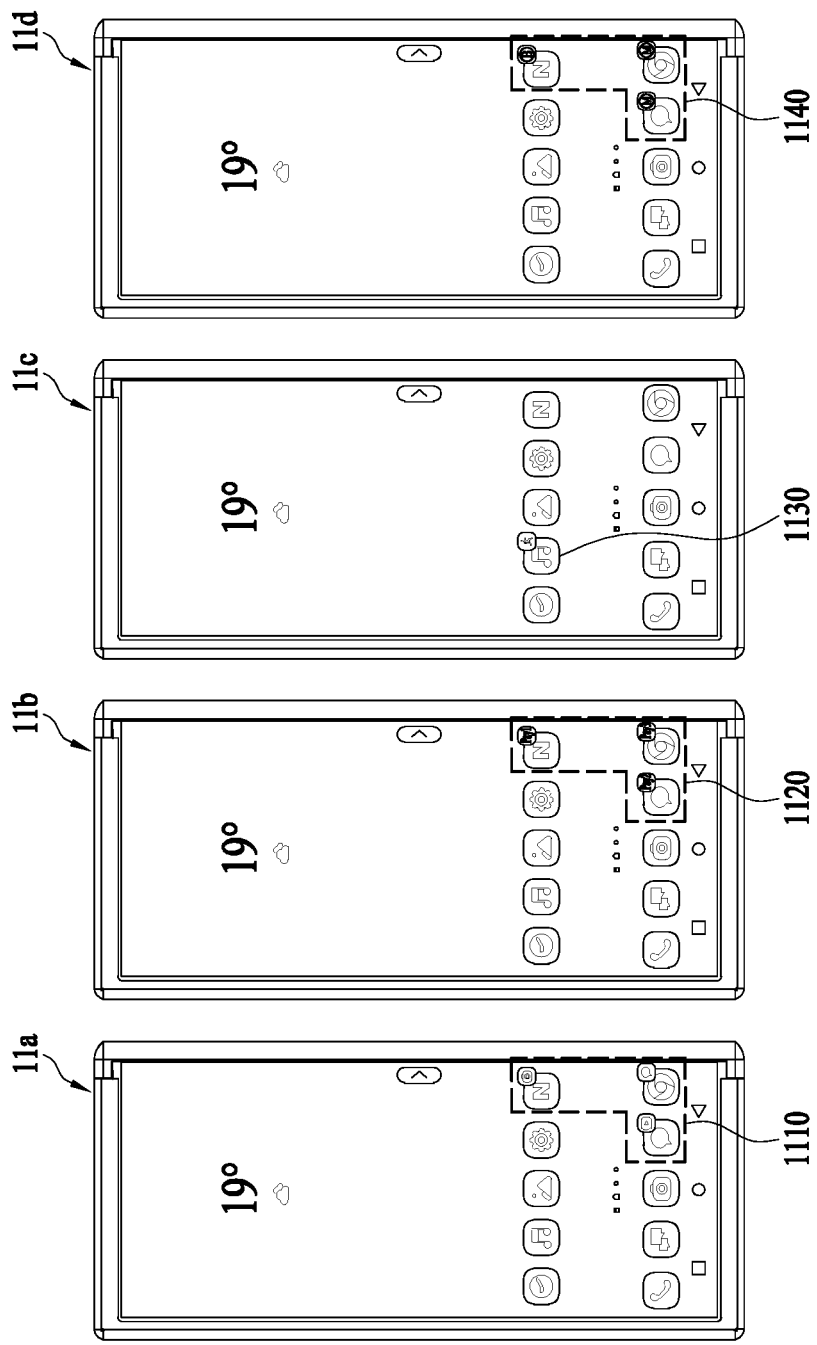
FIG. 11 is a diagram illustrating an example of an icon related to content displayed on an electronic device according to an example embodiment of the present disclosure.

FIG. 11 is a diagram illustrating an example of an icon related to content displayed on an electronic device according to an example embodiment of the present disclosure.

Specifically, FIG. 11 illustrates a case in which a sub-application is displayed on an icon corresponding to a main application when applications are executable in parallel. Reference numerals 11a through 11d illustrate examples of a home screen displayed on the electronic device when applications set to run in parallel differ by location.

The reference numeral 11a indicates a home screen displayed when the location is home. According to the reference numeral 11a, three different icons displayed in a first area 1110 may each include images for two applications executed in parallel. In this instance, an image of a main application may be larger than an image of a sub-application.

When the location of the electronic device is changed to a supermarket, a screen may be provided as indicated by the reference numeral 11b. Specifically, an icon of a second area 1120 corresponding to the first area 1110 of the reference numeral 11a may be changed to an icon representing applications set to run in parallel in the supermarket. At this time, since a changed application corresponds to the sub-application, an image of the icon may appear by changing an area for the image of the sub-application.

The application changed based on the location may correspond to the sub-application. Accordingly, it can be seen that an image of the sub-application is changed in the image included in the icons of the second area 1120.

When the location of the electronic device is changed to the gym, a screen may be provided as indicated by the reference numeral 11c. When the location of the electronic device is the gym, a parallel application execution operation may be set for an application different from the existing applications included in the first area 1110 or the second area 1120.

Specifically, when the location of the electronic device is the gym, a music application may be the main application and a health application may be the sub-application. Accordingly, like an icon 1130, an icon including an image for the music application and an image for the health application may be provided.

When the location of the electronic device is changed to a subway station, a screen may be provided as indicated by the reference numeral 11d. For example, in the subway station, a subway information application may be set to run in parallel with a plurality of applications as the sub-application. In this example, as indicated by the reference numeral 11d, each application included in a third area 1140 may be set to run in parallel with the subway information application.

Accordingly, icons included in the third area 1140 may each include an image for the main application along with an image for the subway information application.

Figure 12:
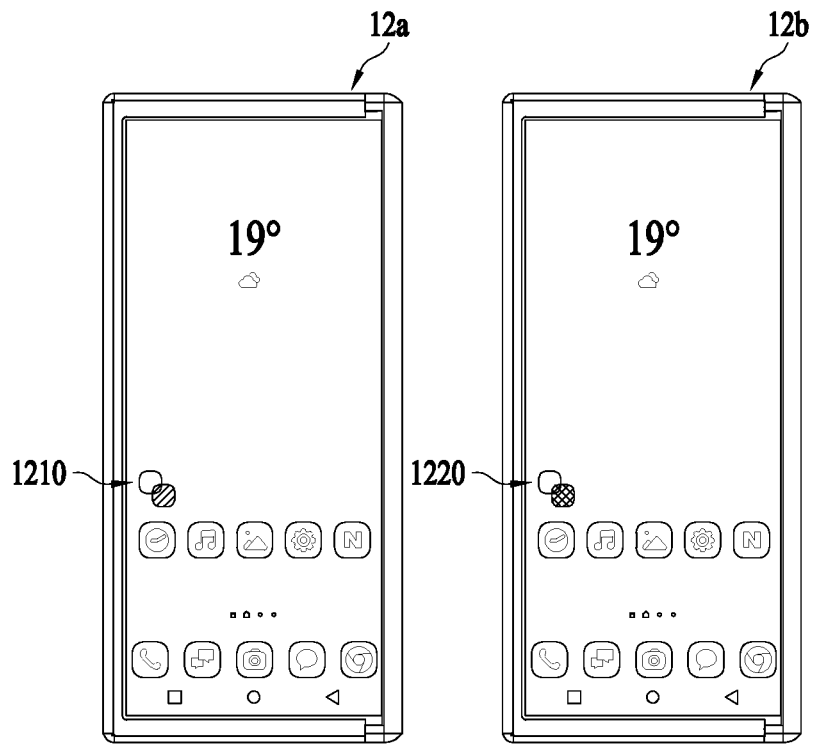
FIG. 12 is a diagram illustrating another example of an icon related to content displayed on an electronic device according to an example embodiment of the present disclosure.

FIG. 12 is a diagram illustrating another example of an icon related to content displayed on an electronic device according to an example embodiment of the present disclosure. Specifically, FIG. 12 illustrates a case in which a new icon related to a parallel application execution is displayed.

Reference numeral 12*a* indicates an example of a screen including a first icon 1210 displayed when a first condition is satisfied. Reference numeral 12*b* indicates an example of a screen including a second icon displayed when a second condition is satisfied.

For example, the first icon 1210 represents a case in which a main application corresponds to a first application and a sub-application corresponds to a second application. The second icon 1220 represents a case in which the main application corresponds to the first application and the sub-application corresponds to a third application.

However, shapes of the first icon 1210 and the second icon 1220 may be changed to various shapes and are not limited to the present examples.

Figure 13:
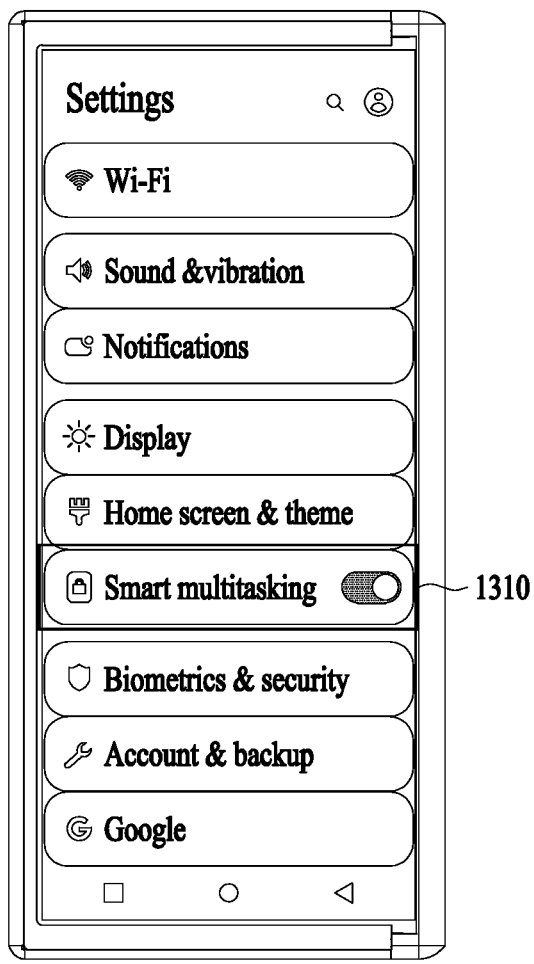
FIG. 13 is a diagram illustrating an example of a screen for setting whether to display content on an electronic device according to an example embodiment of the present disclosure.

FIG. 13 is a diagram illustrating an example of a screen for setting whether to display content on an electronic device according to an example embodiment of the present disclosure.

In response to a setting application of the electronic device being executed, a screen of FIG. 13 may appear. Referring to FIG. 13, in response to a button for a smart multitasking area 1310 being on, the above-described operation of executing a first application and a second application in parallel may be performed.

According to example embodiments of the present disclosure, it is possible to provide an electronic device and a control method of the electronic device that identifies a second application based on at least one of information associated with the electronic device and a first application, thereby more effectively controlling application-related content to be displayed.

Further, according to example embodiments of the present disclosure, it is possible to provide an electronic device and a control method of the electronic device that displays application-related content based on an exposure size change of a display, thereby improving a user convenience related to a use of content.

Further, according to example embodiments of the present disclosure, it is possible to provide an electronic device and a control method of the electronic device that allows a second application to be executed in parallel with a first application based on a predetermined position or predetermined time so that the second application is easily executed in a suitable situation.

The above description is merely illustrative of the technical idea of the present disclosure, and those skilled in the art to which the present disclosure pertains may make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

The invention claimed is:

1. An electronic device comprising:
a display that is flexible, has at least a portion located at a first side of the electronic device, and is changeable in size to which the display is exposed to the first side; and
a controller,
wherein the controller is configured to:
display content related to a first application in at least a portion of the display exposed to the first side;
identify an event that the display exposed to the first side is expanded in size; and
display content related to a second application corresponding to the first application in at least a portion of the expanded display,
wherein the second application is identified based on at least one of execution history information of an application and setting information of an application corresponding to the first application.

2. The electronic device of claim 1, wherein the execution history information comprises history information of an application executed along with the first application, history information of an application executed before or after the first application is executed, or history information of an application executed a predetermined number of times or for a predetermined period of time or more.

3. The electronic device of claim 1, wherein the controller is configured to display a second icon related to an expansion of the display in at least a portion of the display exposed to the first side, and
the event that the display is expanded in size is performed based on a second input corresponding to the second icon.

4. The electronic device of claim 1, wherein, in response to the display exposed to the first side being expanded in size, the controller is configured to display the content related to the second application in an area corresponding to an expanded size of the display.

5. The electronic device of claim 1, wherein the event is identified based on a first input related to an execution of the first application, and
the controller is configured to control at least a portion of the display located to correspond to a second side of the electronic device to be exposed to the first side according to the identified event.

6. An electronic device comprising:
a display that is flexible, has at least a portion located at a first side of the electronic device, and is changeable in size to which the display is exposed to the first side; and
a controller,
wherein the controller is configured to:
display content related to a first application in at least a portion of the display exposed to the first side;
identify an event that the display exposed to the first side is expanded in size; and
display content related to a second application corresponding to the first application in at least a portion of the expanded display,
wherein the controller is further configured to:
identify at least one of a position of the electronic device and current time information; and
display information on at least one application related to the identified at least one in at least a portion of the display exposed to the first side.

7. A method of controlling an electronic device comprising a display that is flexible, has at least a portion located at a first side of the electronic device, and is changeable in size to which the display is exposed to the first side, the method comprising:
- displaying content related to a first application in at least a portion of the display exposed to the first side;
- identifying an event that the display exposed to the first side is expanded in size; and
- displaying content related to a second application corresponding to the first application in at least a portion of the expanded display,
- wherein the second application is identified based on at least one of execution history information of an application and setting information of an application corresponding to the first application.

8. The method of claim 7, wherein the execution history information comprises history information of an application executed along with the first application or history information of an application executed before or after the first application is executed.

9. The method of claim 7, further comprising:
- displaying a second icon related to an expansion of the display in at least a portion of the display exposed to the first side,
- wherein the event that the display is expanded in size is performed based on a second input corresponding to the second icon.

10. The method of claim 7, wherein the displaying of the content related to the second application comprises:
- displaying, in response to the display exposed to the first side being expanded in size, the content related to the second application in an area corresponding to an expanded size of the display.

11. The method of claim 7, wherein the event is identified based on a first input related to an execution of the first application, and
- the method further comprises controlling at least a portion of the display located to correspond to a second side of the electronic device to be exposed to the first side according to the identified event.

12. A method of controlling an electronic device comprising a display that is flexible, has at least a portion located at a first side of the electronic device, and is changeable in size to which the display is exposed to the first side, the method comprising:
- displaying content related to a first application in at least a portion of the display exposed to the first side;
- identifying an event that the display exposed to the first side is expanded in size; and
- displaying content related to a second application corresponding to the first application in at least a portion of the expanded display,
- wherein the method further comprises:
- identifying at least one of a position of the electronic device and current time information; and
- displaying information on at least one application related to the identified at least one in at least a portion of the display exposed to the first side.

* * * * *